(12) United States Patent
Wilson

(10) Patent No.: US 10,057,947 B2
(45) Date of Patent: Aug. 21, 2018

(54) LAMP UNIT POWER SUPPLY SYSTEM

(71) Applicant: TRIDONIC UK LTD, Chineham Basingstoke (GB)

(72) Inventor: Ian Wilson, Sunderland (GB)

(73) Assignee: TRIDONIC UK LTD, Chineham Basingstoke (GB)

( * ) Notice: Subject to any disclaimer, the term of this patent is extended or adjusted under 35 U.S.C. 154(b) by 0 days.

(21) Appl. No.: 15/485,939

(22) Filed: Apr. 12, 2017

(65) Prior Publication Data

US 2017/0290110 A1 Oct. 5, 2017

Related U.S. Application Data

(63) Continuation of application No. 14/382,612, filed as application No. PCT/EP2013/054591 on Mar. 7, 2013, now abandoned, application No. 15/485,939, which is a continuation of application No. 14/385,847, filed as application No. PCT/EP2013/055654 on Mar. 19, 2013, now abandoned.

(30) Foreign Application Priority Data

Mar. 8, 2012 (GB) .................................. 1204106.7
Mar. 19, 2012 (GB) .................................. 1204787.4

(51) Int. Cl.
*H02J 9/00* (2006.01)
*H05B 33/08* (2006.01)
*H02J 9/06* (2006.01)
*H02J 7/02* (2016.01)

(52) U.S. Cl.
CPC ............ *H05B 33/0809* (2013.01); *H02J 7/02* (2013.01); *H02J 9/061* (2013.01); *H02J 9/062* (2013.01); *Y10T 307/625* (2015.04)

(58) Field of Classification Search
CPC .. H02J 9/061; H02J 9/062; H02J 9/065; H02J 7/34; H02J 1/10
USPC .......................................................... 307/66
See application file for complete search history.

(56) References Cited

U.S. PATENT DOCUMENTS 3,869,639 A 3/1975 Herzog
5,661,645 A * 8/1997 Hochstein ............... H02J 9/065
363/89

(Continued)

FOREIGN PATENT DOCUMENTS

CN 101427439 A 5/2009
CN 101427440 A 5/2009

(Continued)

OTHER PUBLICATIONS

Jojo, "UPS—Uninterruptable Power Supplies—Electronic Circuits and Diagram—Electronic Projects and Design" Oct. 7, 2009, 11pgs.

*Primary Examiner* — Alfonso Perez Borroto
(74) *Attorney, Agent, or Firm* — Volpe and Koenig, P.C.

(57) ABSTRACT

A power supply system for illuminating an LED lamp unit, having a normal mode of operation in which a mains input of a driver of the LED lamp unit is supplied by mains power, and an emergency mode of operation, in which the LED lamp unit is supplied by a charge storage device, is disclosed. The system includes an emergency mode converter operable to step-up the voltage from the charge storage device and to supply the mains driver input for illuminating the LED lamp unit.

19 Claims, 7 Drawing Sheets

(56) References Cited

U.S. PATENT DOCUMENTS

| | | |
|---|---|---|
| 6,339,296 B1 | 1/2002 | Goral |
| 9,270,143 B1 * | 2/2016 | Mangiaracina ......... H02J 9/062 |
| 2002/0047639 A1 | 4/2002 | Okuchi et al. |
| 2003/0168999 A1 | 9/2003 | Yamamoto et al. |
| 2008/0191628 A1 | 8/2008 | Marques et al. |
| 2008/0296975 A1 | 12/2008 | Shakespeare et al. |
| 2009/0026962 A1 | 1/2009 | Zilberberg |
| 2009/0187925 A1 | 7/2009 | Hu et al. |
| 2010/0038965 A1 * | 2/2010 | Rohner ................... H02J 9/065 |
| | | 307/66 |
| 2011/0181206 A1 | 7/2011 | Liess |
| 2012/0262063 A1 | 10/2012 | Mangiaracina |
| 2013/0147376 A1 * | 6/2013 | Trainor ................... H02J 9/065 |
| | | 315/200 R |

FOREIGN PATENT DOCUMENTS

| | | |
|---|---|---|
| CN | 101706079 A | 5/2010 |
| CN | 101932153 A | 12/2010 |
| CN | 201781652 U | 3/2011 |
| CN | 201884957 U | 6/2011 |
| CN | 201976304 U | 9/2011 |
| EP | 1202428 A1 | 5/2002 |
| EP | 1274286 A1 | 1/2003 |
| WO | 2010027392 A1 | 3/2010 |
| WO | 2010040634 A1 | 4/2010 |
| WO | 2010043923 A1 | 4/2010 |

\* cited by examiner

US 10,057,947 B2

LAMP UNIT POWER SUPPLY SYSTEM

INCORPORATION BY REFERENCE

The present application is a continuation of: U.S. patent application Ser. No. 14/382,612, filed Sep. 3, 2014, which is a § 371 National Phase of PCT/EP2013/054591, filed Mar. 7, 2013; and U.S. patent application Ser. No. 14/385,847, filed Sep. 17, 2014, which is a § 371 National Phase of PCT/EP2013/055654, filed Mar. 19, 2013. The entire contents of all of these applications are incorporated by reference herein as if fully set forth.

FIELD OF THE INVENTION

The present invention relates to a power supply system for supplying lamp unit power, and to a power supply method for supplying lamp unit power.

BACKGROUND

Various arrangements for lighting systems are known which provide both conventional and emergency lighting. Such emergency lighting is intended to be activated when the conventional lighting is no longer operative because the direct mains supply to the conventional lighting is no longer available or malfunctions. Emergency lighting is typically powered by a battery or other energy storage device. Conventional lighting is controlled by an on/off switch by means of which a user (or control system) can control whether the lighting is illuminated or not. Generally, emergency lighting is intended to be automatically illuminated when the absence of mains power or the malfunction of mains power for the conventional lighting is detected in some way. Emergency lighting may be used to allow escape from buildings that would otherwise be in darkness due to the inoperativeness of the conventional lighting.

Emergency lighting and conventional lighting may share components. For example, the same lamp (such as a gas discharge lamp or light emitting diode) may be used for both conventional and emergency lighting. Other components may also be shared.

A lighting system comprising emergency lighting and conventional lighting may be considered to have two operating modes. In a normal mode, when the direct mains supply is operating normally (within the normal voltage range), a switched mains input, controlled by an on/off switch, is monitored, and the lamp is illuminated or extinguished in dependence upon the switched mains input. In an emergency mode, when the mains supply is not available or is malfunctioning (is outside the normal voltage range), the lamp is illuminated automatically, irrespective of the status of the switched mains input, using power from a battery or other storage element.

FIG. 1 shows schematically the elements of a lighting arrangement that provides both a normal mode and an emergency lighting mode. A mains AC supply 1 provides power in the normal mode to a mains ballast 3 optimized for use with the mains supply 1. The mains ballast 3 drives the lamp 5 when a mains relay 7 is closed. A control circuit (not shown) monitors the mains AC supply 1. If the control circuit detects that the mains AC supply is interrupted, or if it is determined to be malfunctioning (operating outside an acceptable range of values), the control circuit may provide an appropriate signal to relay control line 9 to open the mains relay 7 and to close an emergency relay 11. The emergency relay 11 allows the lamp 5 to be driven in an emergency mode.

To provide the emergency mode, the emergency lighting arrangement includes, in addition to the mains relay 7, relay control line 9 and emergency relay 11, a battery charger 13, a battery 15 and an emergency driver 17.

When the mains AC supply 1 is operating normally (and the lamp 5 is powered by the mains ballast 3), the battery 15 is charged (continuously or when required) by the battery charger 13. The battery charger 13 provides galvanic isolation between the AC mains supply 1 and the battery 15. When the control circuit detects that the AC supply 1 is interrupted (or malfunctioning), the emergency relay 11 is closed (the mains relay 7 is opened), and the emergency driver 17 illuminates the lamp 5 using power from the battery 15. Emergency driver 17 provides galvanic isolation of the battery 15 from the lamp 5.

As will be known to those skilled in the art, gas discharge lamps, such as fluorescent lamps, require an arc voltage to be applied between the lamp electrodes by a lamp arc supply. For most gas discharge lamps the lamp cathodes are heated by a cathode supply in order to heat the cathode filaments to cause them to emit electrodes into the gas within the lamp tube by thermionic emission.

Known emergency lighting arrangements do not provide an effective way of controlling lamp power for optimum lamp operation.

Known emergency lighting arrangements do not provide an effective way of controlling the battery discharge for optimum battery operation.

SUMMARY

In one aspect, the present invention provides a power supply system for supplying lamp unit power, the system including a driver for receiving power from a power supply and operable to provide the lamp power from the power supply, characterized in that the driver is operable to adjust the total power provided to the lamp unit from the power supply.

The driver can vary the proportion of current drawn from the battery. The driver can also adjust the total power provided to the lamp unit from the power supply and optionally can adjust the power provided as the arc power and as the cathode power.

The lighting system may be an emergency lighting system. The power supply may be a battery or other charge storage device.

The lamp unit may comprise one or more lamps, such as light emitting diodes (LED) or gas discharge lamps, e.g. fluorescent lamps.

In another aspect, the present the invention provides a power supply system for supplying a lamp unit, the system including a driver for receiving power from a battery as power supply and operable to provide the lamp power from the power supply, characterized in that the driver is operable to adjust the total power provided to the lamp unit from the power supply and to adjust the current drawn from the battery at the optimum level despite the changes to the characteristics of the battery or alternation of the lamp unit characteristics.

The driver may adjust the current or power drawn from the battery at the optimum level despite the changes to the characteristics of the battery or alternation of the lamp unit characteristics.

The driver may adjust a first parameter to set the ratio of arc power to cathode power supplied, and then may adjust a second (different) parameter to set the total power provided to the lamp unit whilst maintaining the set ratio. The first parameter may be the frequency of operation of at least one switch of the driver and the second parameter may be the duty cycle of at least one switch of the driver, the or each switch controlling application of power from the power supply to the lamp.

The driver may include an input part and an output part. Preferably, the input part and the output part are galvanically isolated.

The output part may include a plurality of circuits, each having a different frequency response, and wherein the input part is operable to supply the output part at a selected frequency to provide a desired proportion of the arc power to the cathode power. Because the circuits have different frequency responses the proportion of the power supply current in the respective circuits is different at different frequencies. The embodiment to be described allows a desired proportion of the available power to be provided as arc power and as cathode power by selecting an appropriate frequency at which the frequency responses are such that the respective proportions of power for the arc power and the cathode power exist. The battery current at the selected frequency may, however, not be at a desired level and, in the embodiment, the battery current may be reduced in order to adjust the total power provided to the lamp unit. The circuits may be multiple-order circuits. The circuits may be second order circuits, such as L and C series and L series and C parallel circuits.

The output part may be formed by passive components only. The output part may comprise a filter stage and a rectifier. The input part can be operable to supply the output part at a selected frequency or pulse width to provide a desired amount of the lamp power or to adjust the amount of current or power drawn from the battery.

The input part may include pulse width modulation means operable to adjust the total power provided to the lamp unit, and thereby enable an optimal current to be drawn from the power supply, which is controllable independently of the frequency selection.

The driver may comprise a push-pull converter, such as a DC-AC push-pull inverter, a flyback converter, a boost converter or another type of switched converter.

The system may be operable to maintain a desired level of arc power and a desired level of cathode power when a quality or quantity of the lamp(s) when a lamp unit is changed. For example, a lamp may be changed for a lamp with different characteristics, or a further lamp may be added to the lamp unit. This may be done by a user after installation of the system.

The system may be operable to maintain a desired level of lamp power when the power supply is altered. For example, a battery may be replaced, or an additional cell may be added. This may be done by a user after installation of the system.

The present invention also provides an emergency lighting arrangement including the power supply system as defined above, which may further include the power supply mentioned above.

The present invention also provides a power supply method as defined in the claims.

The present invention also provides a power supply method for supplying lamp unit power, wherein a driver receives power from a power supply to provide the lamp power from the power supply, characterized in that the driver is operable to maintain a desired level of total power provided to the lamp unit from the power supply when a quantity or quality of the lamp(s) in the lamp unit is changed or when the power supply is altered.

In one embodiment to be described a power control method uses pulse width modulation (PWM) in the form of dead time or duty cycle control in order to obtain the correct current or power levels drawn from a battery set in order to power a lamp at the output of an emergency converter for driving the lamp from a battery set. A step-up inverter supplies high frequency rectangular symmetric waveform to the output with galvanic isolation. The converter used may be an inverting flyback type. Other output circuit arrangements are possible. Other modulation methods can be applied as well.

The system allows the addition of another battery as a means of improving lamp power in emergency mode. PWM can be applied for regulating the total output power, adapting the emergency system to the extra battery. If the battery is changed, for example by adding additional cells (or replacing the battery with a different battery), or in any other way, this may alter the nominal current. In response to this, the switch duty cycle may be adjusted so that the current drawn from the battery is at the optimum level despite the changes to the characteristics of the battery.

In one embodiment to be described a power control method uses pulse width modulation (PWM) in the form of dead time or duty cycle control and frequency modulation (FM) in order to obtain the correct power levels for lamp arc and cathodes in the output of an emergency converter for driving fluorescent lamps from a battery set. A step-up inverter supplies high frequency rectangular symmetric waveform to the output with galvanic isolation. The converter used may be an inverting dc-ac push-pull type. The output comprises three second order circuits: one L series and C parallel for the arc; two equal L and C series for the cathodes. Other output circuit arrangements are possible.

If the respective output circuit arrangements for the lamp arc and lamp cathodes have a different frequency response, in principle frequency modulation can be used to select a frequency at which the response of the respective output circuits provides a desired proportion of power to the lamp arc and a desired proportion of power to the lamp cathode. However, at the frequency which provides the desired frequency response, the current drawn from the battery set may not be the optimum current. PWM allows the optimum current to be drawn at any selected frequency.

For example, if only applying frequency modulation/control, the need for a multi-lamp compatible system together with the fixed frequency response of the two filter types leads to a non-optimized power ratio in some loads cases. PWM can be applied to add another degree of freedom in the power regulation, enabling optimized arc and cathodes supply. Once the frequency for achieving the right arc to cathodes power ratio is set, PWM can regulate the right level of total output power, which yields in an optimized power in the lamp. In the embodiment, power regulation consists of setting a certain value of average battery discharge current.

The system allows the addition of another battery as a means of improving only lamp arc power in emergency mode. Such feature is not realisable, however, applying only FM. Again, FM can set the optimum power ratio and PWM can be applied for regulating the total output power, adapting the emergency system to the extra battery.

The embodiment to be described illustrates how to implement a system and method able to supply the correct arc and cathode power for all lamp cases in the most optimized way. Further, the embodiment allows the possible addition of an extra battery for improving only the arc power instead of transferring the extra power with similar arc-cathode ratio to the load. Battery count reduction is also enabled by applying such regulation technique.

One possible implementation of the system and method of the embodiment for optimizing the regulation of power levels delivered to the lamp arc and cathodes in emergency mode may be the following:
1. Enables the correct power supply levels for the lamp arc and cathodes in fluorescent lamp ballasts supplied from a battery set.
2. Enables the correct power supply levels for the lamp arc and cathodes in fluorescent lamp emergency unit in emergency mode of operation.
3. Provides a possibility of adjusting the lamp arc and cathode power other than frequency modulation without changing the circuit in a fluorescent lamp emergency unit.
4. In case of multi-lamp supply using the same emergency unit, optimizes the power supplied to the fluorescent lamp arc and cathodes for each particular input voltage and load case (lamp type).
5. In case of adding a battery (or batteries) to the set of a fluorescent lamp emergency unit, enables the transfer the power available from that addition in emergency mode only to the arc, improving ballast lumens factor (BLF).
6. In case of reducing a battery (or batteries) from the battery set, of a fluorescent lamp emergency unit, enables the setting of the most optimized power level in the lamp arc and cathodes in emergency mode (in this case, often increasing power in the cathodes and reducing in the lamp).
7. Enables the adjustment of the output power levels (lamp arc and cathodes) of a fluorescent emergency unit in production through a calibration procedure.
8. The above features can be limited to the lamp power in case where a light emitting diode is used as lamp load (no cathode heating).

The embodiment provides power regulation/control in the lamp (e.g. fluorescent lamp arc and cathodes), independently of the lamp type and battery set voltage. As it may not be possible to set proper power levels for multi-lamp and multi-battery applying only FM due to filters and lamps characteristics, the use of PWM adds another degree of freedom, enabling the required regulation.

As some embodiments describe a fluorescent lamp driver it has to be stated such system is only one example described for better understanding and the invention may be used for other kinds of lamp drivers such as light emitting diodes as well. The arc power correlates to the lamp power which is the light generating power.

BRIEF DESCRIPTION OF THE DRAWINGS

For a better understanding of the present invention an embodiment will now be described by way of example, with reference to the accompanying drawings, in which.

In the drawings generally like elements are designated with the same reference sign.

DETAILED DESCRIPTION OF PREFERRED EMBODIMENTS

Figure 1:
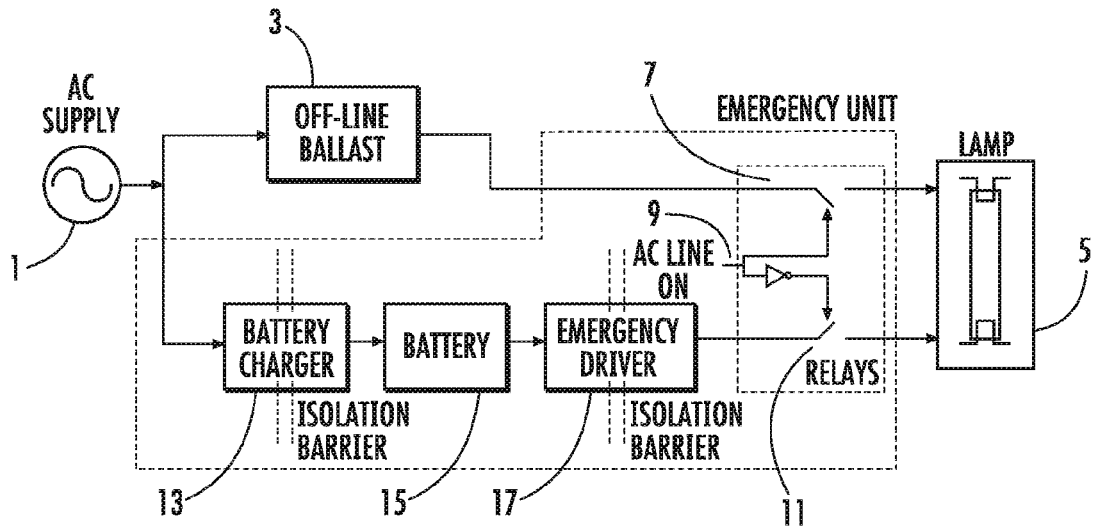
FIG. 1 shows schematically the elements of a lighting arrangement that provides both a normal mode and an emergency lighting mode.

As briefly discussed above, the lighting arrangement shown in FIG. 1 includes a control unit (not shown) which detects when the AC mains supply 1 is present and operating correctly—such as when the AC mains supply 1 presents a voltage higher than a certain threshold (187 volts in a 230 volt nominal supply, for example). When the AC mains supply 1 is present and operating correctly, the mains ballast 3 provides power to illuminate the lamp via closed relay 7. Power from the AC mains supply 1 is also provided to battery charger 13 to charge the battery 15 (or to keep the battery 15 fully charged). The battery 15 may comprise a plurality of cells. Another energy storage device may be used instead of the battery 15.

When the control unit detects that the AC mains supply 1 is interrupted or malfunctioning—such as when the mains AC supply 1 presents a voltage lower than a certain threshold (145 volts in a 230 volt nominal supply, for example) the control unit opens the mains relay 7, closes the emergency relay 11, and activates the emergency driver 17. Emergency driver 17 provides power to illuminate the lamp 5 from only the battery 15 via the closed emergency relay 11. Isolation is provided from the AC mains line 1 to the battery 15 for safety reasons. The lamp 5 may be a gas discharge lamp or a light emitting diode (LED).

Figure 2:
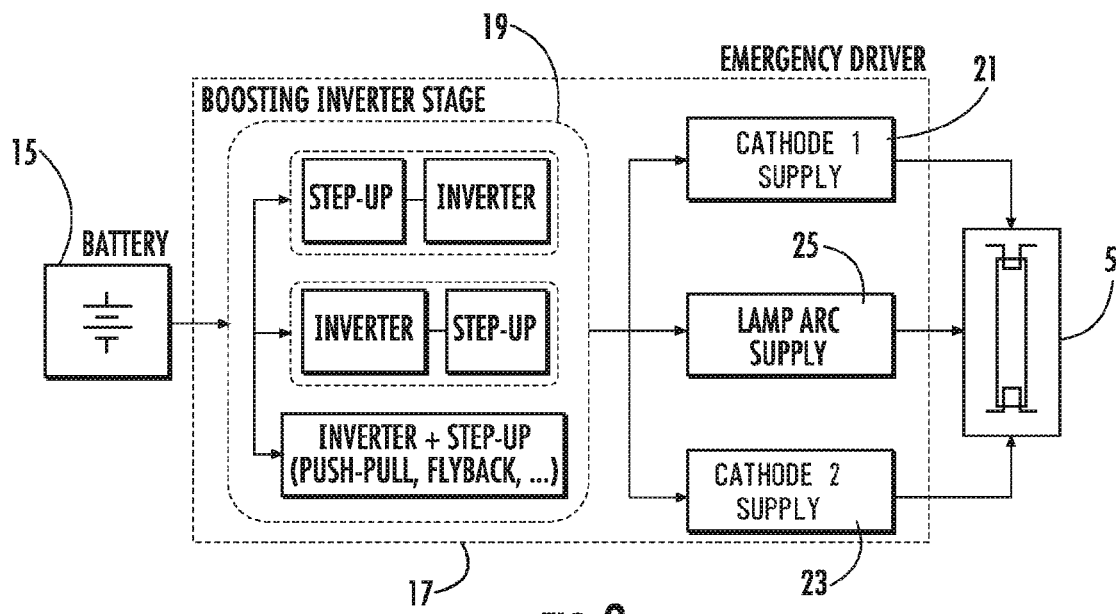
FIG. 2 shows schematically an emergency driver in accordance with an embodiment of the invention.

An emergency driver 17 in accordance with an embodiment of the invention is shown in FIG. 2. The emergency driver 17 may comprise a boosting converter stage 19, e.g. a push-pull converter with a step-up characteristic, whose input is connected directly to the battery 15. The boosting converter stage 19 may be also comprised by a combination of a push-pull converter followed by a step-up converter, e.g. a boost converter, or a combination of a step-up converter followed by a push-pull converter.

The emergency driver 17 may provide a first cathode supply 21 and a second cathode supply 23 to heat the cathode filaments in case where the lamp 5 is a fluorescent lamp and a lamp arc supply 25. In case of a light emitting diode as lamp 5 there may be only a lamp supply 25. The lamp supply 25 may be a single stage converter as e.g. a flyback converter which takes over the function of the boosting converter stage 19.

Figure 3:
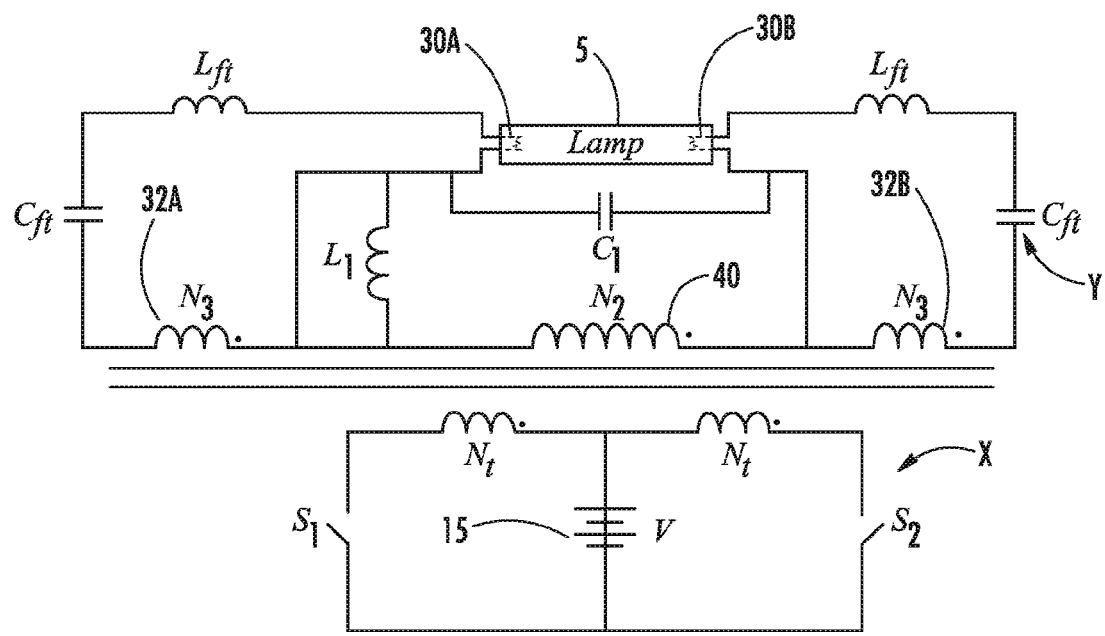
FIG. 3 shows an emergency driver circuit connected to a lamp and a battery in accordance with an embodiment of the invention.

FIG. 3 shows one example of the emergency driver 17 circuit connected to the lamp 5 and battery 15.

Figure 4:
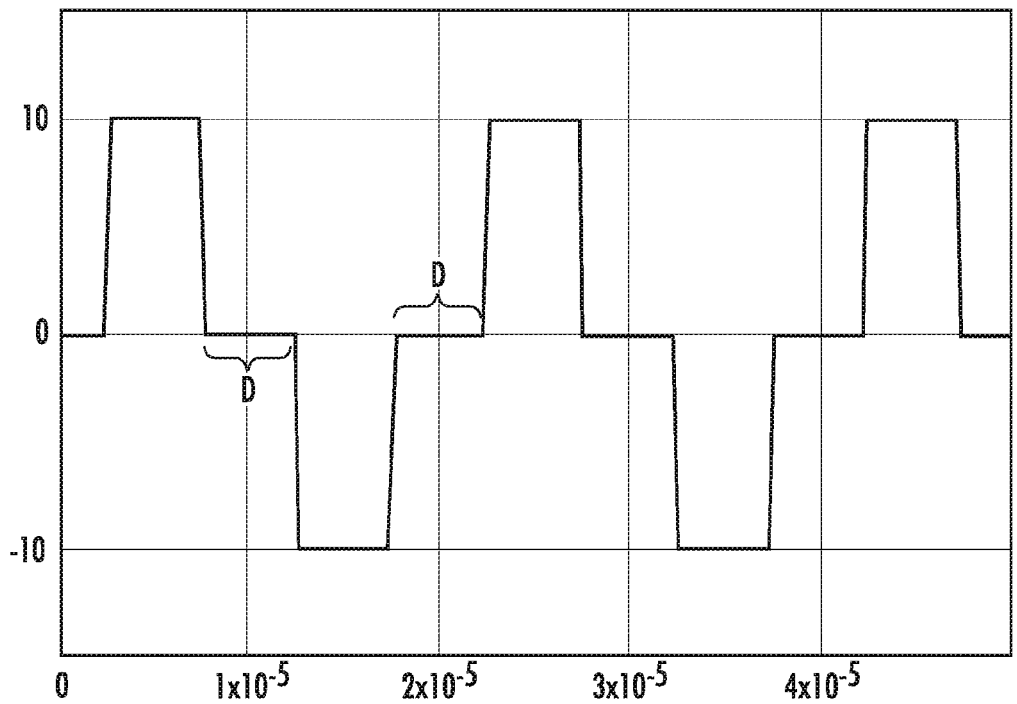
FIG. 4 shows the rectangular alternating output voltage produced by the input part of the emergency driver circuit of FIG. 3, the vertical axis showing the voltage and the horizontal axis showing time.

The emergency driver 17 comprises an input part X in the form of a bi-directional push-pull inverter. The input part X includes identical first and second portions connected in parallel across the battery 15. Each of the portions comprises a switch $S_1/S_2$ and a primary winding section $N_1$. By alternate operation of the switches $S_1/S_2$, the input part produces a rectangular alternating output voltage, as shown in FIG. 4. The output may include a "dead time" D when both the switches $S_1$ and $S_2$ are closed, when the output is at zero volts. The duty cycle of the switches determines the duration of the dead time. The time for which each of the switches is closed and the frequency of operation (opening/closing) of the switches is controlled by a driver controller.

The input part X of the emergency driver 17 supplies an output part Y. The respective lamp cathodes 30A and 30B are supplied via the two identical secondary windings $N_3$ of the push-pull inverter of the output part Y with LC series identical filters connected to them. The first cathode 30A is connected to the first secondary winding 32A via series connected capacitor $C_{f1}$ and inductor $L_{f1}$. The second cathode 30B is connected to a second secondary winding 32B via a series connected second capacitor $C_{f2}$ and inductor $L_{f2}$.

The lamp arc supply is provided by another secondary winding 40 of the push-pull inverter through a L series C parallel filter, comprising inductor $L_s$ (connected in series between the secondary winding 40 and the first cathode 30A) and capacitor $C_L$ (connected in parallel across the first cathode 30A and the second cathode 30B).

A voltage is applied to the lamp filters with a magnitude proportional to the battery voltage and the turns ratio, as described by equation (1).

$$V_Q = \frac{N_S}{N_P} \cdot U_{Batt} \quad (1)$$

where $N_P$ and $N_S$ are the primary and secondary turns number and $U_{Batt}$ is the battery 17 voltage.

The primary turns number is the same for both arc and cathodes supply ($N_1$ in FIG. 3). The secondary turns number is the same for both of the two cathodes ($N_3$ in FIG. 3) and different for the arc supply ($N_2$ in FIG. 3).

The rectangular waveform shown in FIG. 4 is composed of the sum of its first and its odd harmonics, changing harmonics amplitudes according to its duty cycle. Such voltage is applied to the set filters and loads (arc and cathodes).

Figure 5:
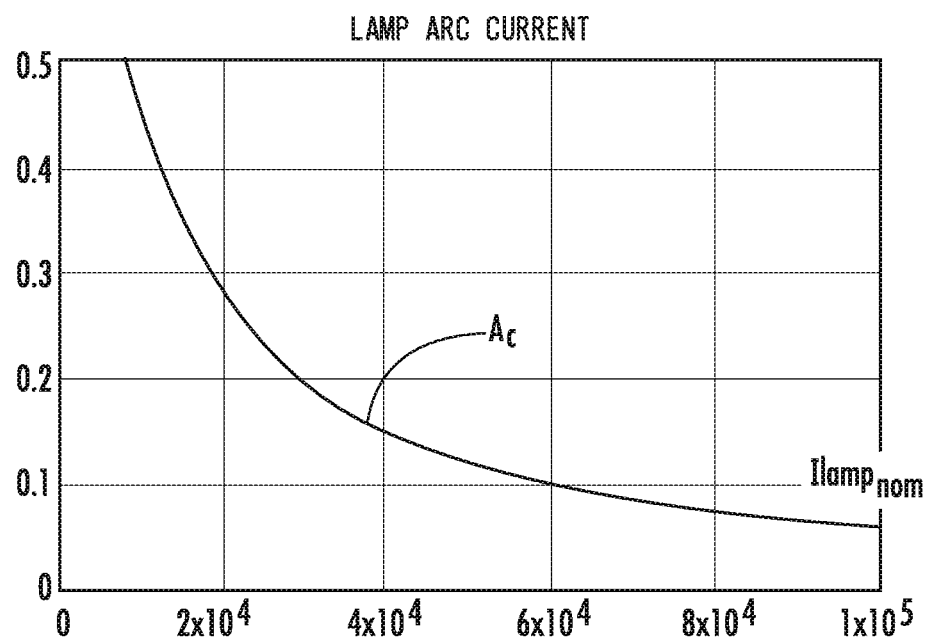
FIG. 5 shows fluorescent lamp arc current response across frequency, the vertical axis showing current in amps and horizontal axis showing frequency in Hertz.

For a given lamp, the typical frequency response of the lamp arc current Ac for a certain L series C parallel filter ($L_s$ and $C_L$), considering the lamp as an equivalent resistance $R_L$ (fixed), is shown in FIG. 5. The plot is based on the response of equation (2).

$$I_{RL}(s) = \frac{\frac{1}{L \cdot C}}{s^2 + s \cdot \frac{R_L}{L} + \frac{1}{L \cdot C}} \quad (2)$$

$$I_{RL}^{(S)} = 1/L \cdot C/s^2 + s \cdot R_L/L + 1/L \cdot C \quad (2)$$

Where L is the inductance
C is the capacitance
s is the frequency

Figure 6:
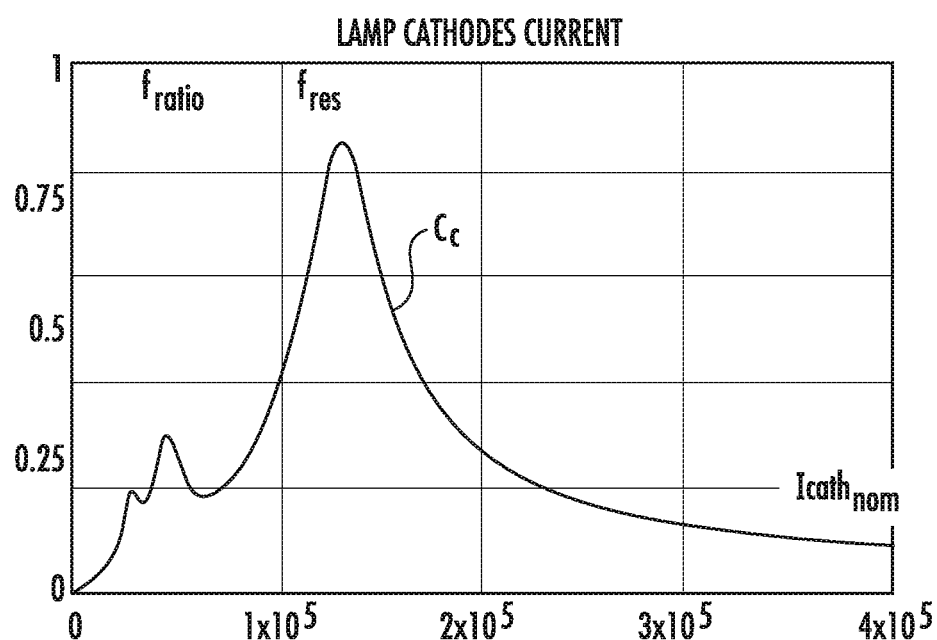
FIG. 6 shows lamp cathode current response across frequency, the vertical axis showing current in amps and the horizontal axis showing frequency in Hertz.

For a given lamp, the typical frequency response of the cathode current $C_c$ for a certain LC series filter ($L_{f1}$ and $C_{f1}$, or $L_{f2}$ and $C_{f2}$) and a certain cathode resistance $R_{cath}$ supplied with a rectangular waveform is shown in FIG. 6, whose plot is based on equation (3).

$$I_{Cath}(s) = \frac{\frac{V_{IN}}{L} \cdot s}{s^2 + s \cdot \frac{R_{Cath}}{L} + \frac{1}{L \cdot C}} \quad (3)$$

Where L is the inductance
C is the capacitance
s is the frequency
$V_{IN}$ is the voltage The response of FIG. 6 includes the effect of the rectangular waveform (FIG. 4) harmonics. It can be seen that, due to the filter characteristic and amplitude of harmonics, the $3^{rd}$ and the $5^{th}$ harmonic are considerable in the range from 20 kHz up to 50 kHz.

Figure 7:
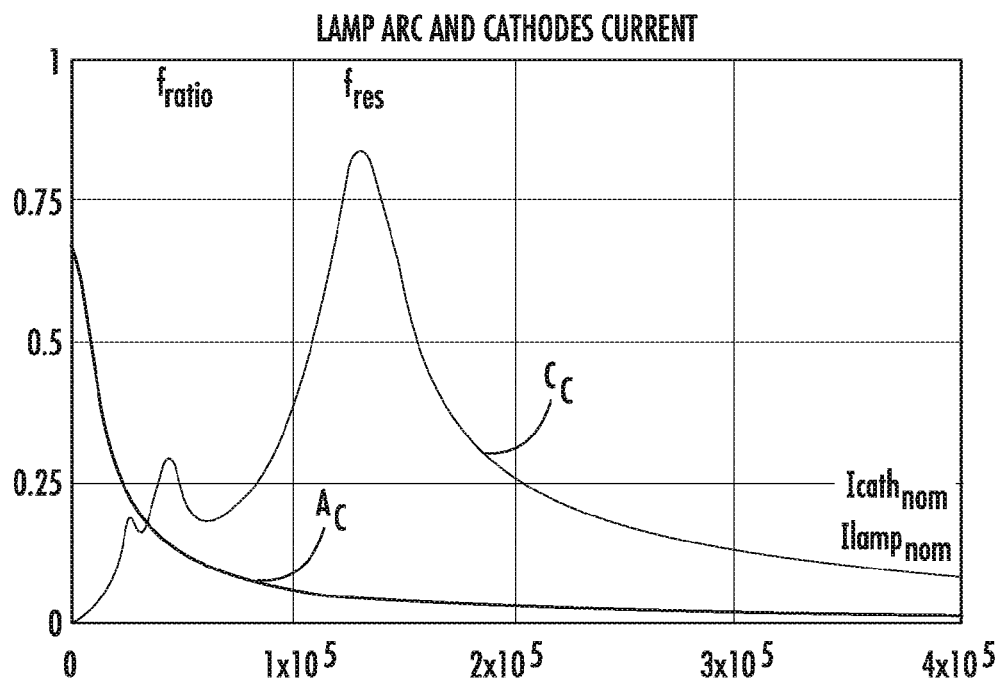
FIG. 7 shows fluorescent lamp arc and cathode current response across frequency, the vertical axis showing current in amps and the horizontal axis showing frequency in Hertz.

FIG. 7 shows both responses from FIGS. 5 and 6 in the same plot for comparison.

Figure 8:
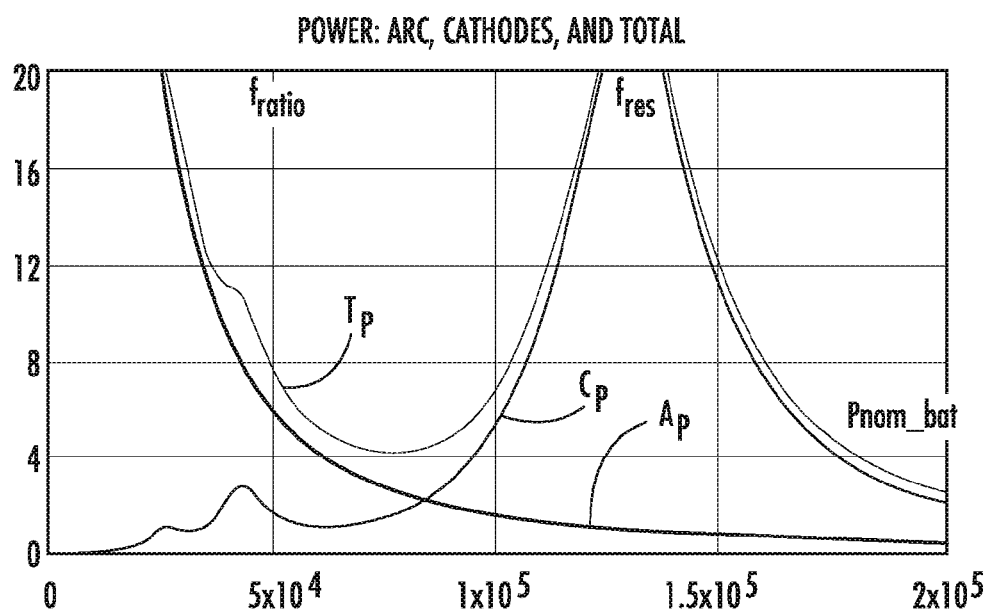
FIG. 8 shows fluorescent lamp arc power response, cathode power response and the total power across frequency, the vertical axis showing power in watts and the horizontal axis showing frequency in Hertz.

As an objective is to regulate the power, FIG. 8 illustrates the power response of the lamp arc $A_p$ and cathodes $C_p$, which are derived directly from the resistance and current from equations (2) and (3) (power=current²×resistance), and also shows the total power $T_p$.

Figure 9:
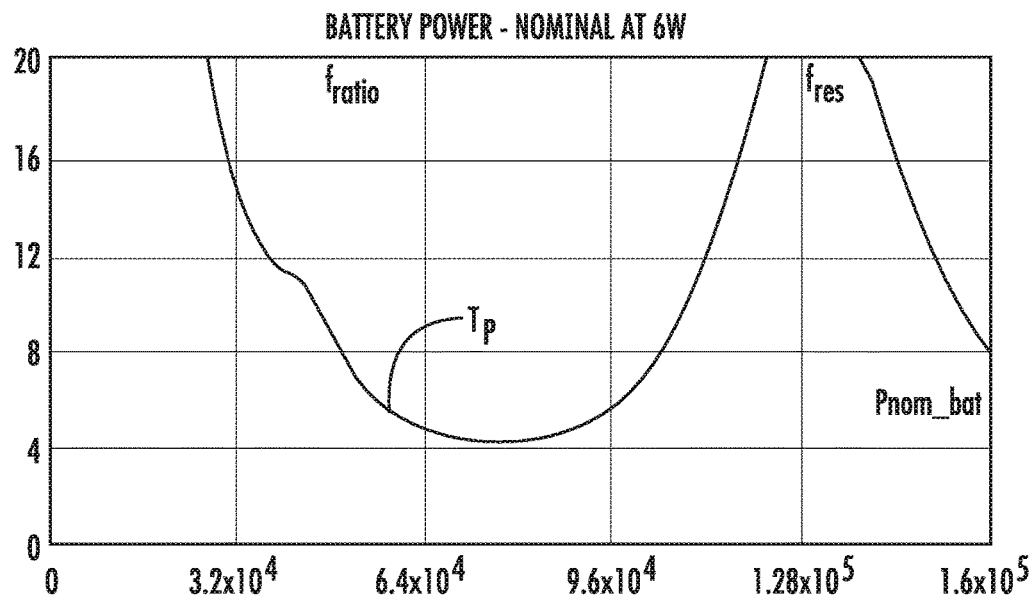
FIG. 9 shows the total power response across frequency, the vertical axis showing power in watts and the horizontal axis showing frequency in Hertz.
Figure 10:
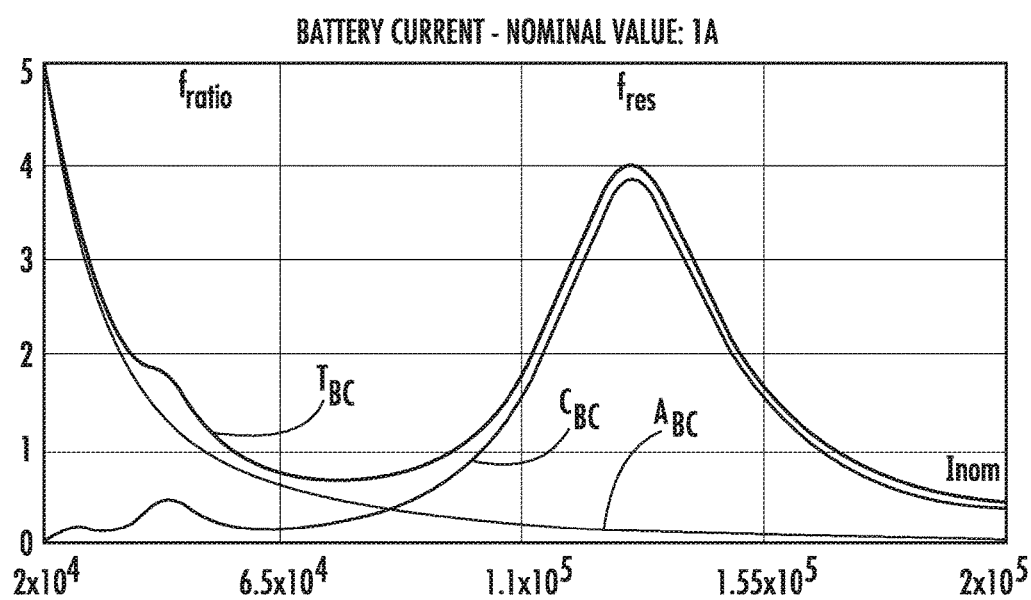
FIG. 10 shows battery current frequency response for the lamp arc, cathode and total supply power, the vertical axis being current in amps and the horizontal axis being frequency in Hertz.
Figure 11:
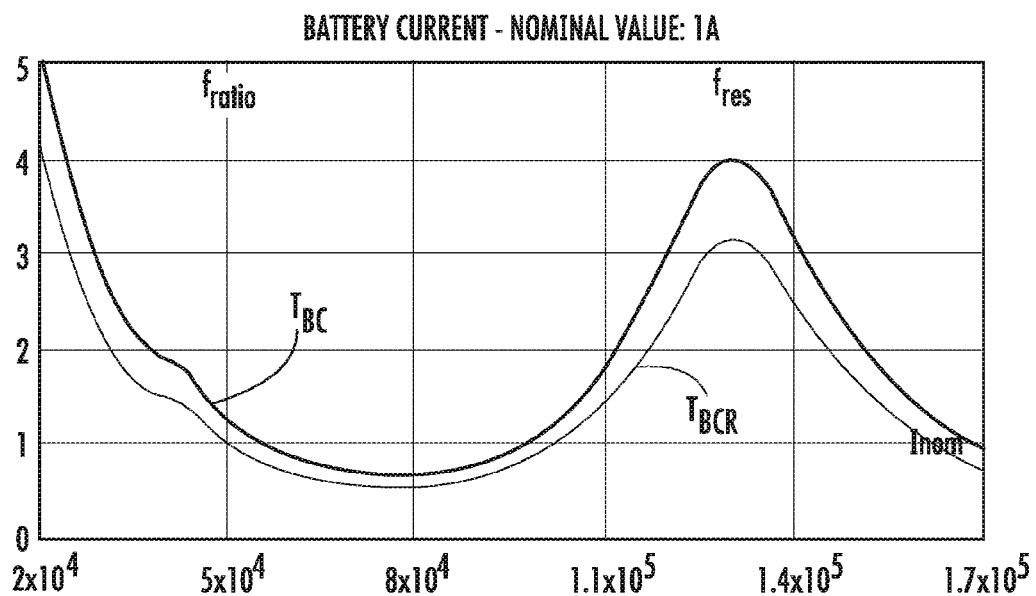
FIG. 11 shows battery current due to cathode and arc power reflecting frequency response at a 100% duty cycle and a reduced duty cycle, the vertical axis being current in amps and the horizontal axis being frequency in Hertz.
Figure 12:
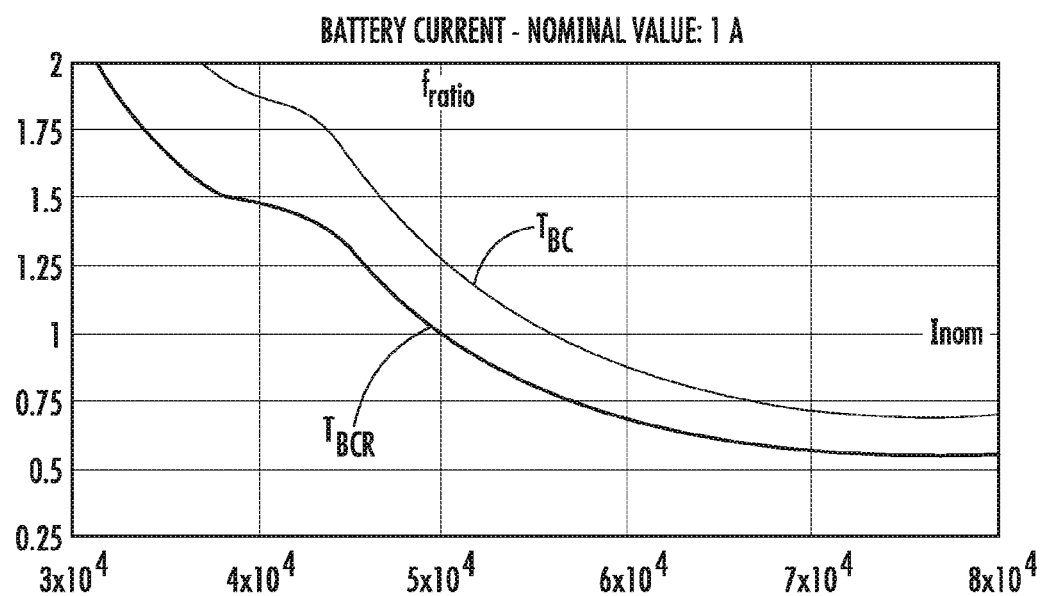
FIG. 12 shows battery current due to cathode and arc power reflecting frequency response at a 100% duty cycle and a reduced duty cycle, the vertical axis being current in amps and the horizontal axis being frequency in Hertz.

FIG. 9 shows again the total power $T_p$ supplied from the battery 15 (neglecting converter efficiency) across a range of frequencies for the emergency converter. As the battery 15 is a DC voltage source, its average current is exactly equal to the power divided by its voltage. Thus, the current reflects the total output power plus losses in the converter in this embodiment. FIGS. 10 and 11 show the battery current for a 6.0V battery as an example, ignoring converter efficiency. FIG. 10 shows the battery currents due to power in the cathodes $C_{BC}$ power in the arc $A_{BC}$ and the total power $T_{BC}$, the sum of the cathode and arc power. Those battery current responses are of interest for detailed analysis as an objective of the emergency converter of FIG. 3 is to regulate the current in the battery for regulating power. The current $T_{BC}$ due to the total power is also shown in FIGS. 11 and 12.

As can be seen in the plots of FIG. 10, a change in the converter switching frequency yields in a change in the power ratio between arc and cathodes. Setting the appropriate switching frequency ($f_{ratio}$) is a first step for achieving optimum power regulation.

At first, based on the current and power responses and particular characteristic of a certain lamp, the $f_{ratio}$ frequency (50 kHz in this example) is chosen as it offers the required power ratio between lamp arc and cathodes. All plots (in FIGS. 6 to 12) present $f_{ratio}$ for illustrating this example. The switches S, and $S_2$ are therefore operated at the frequency $f_{ratio}$.

However, in this example, the total power is too high for the battery nominal current of 1 A. The power for $f_{ratio}$ yields in approximately 1.25 A in the battery (see FIGS. 10 to 12), which is 25% higher than the nominal.

As the ratio between arc and cathodes power is correct at $f_{ratio}$, the total power is regulated independently of that. In this example, that is realized by reducing the duty cycle of the converter. This is done by reducing the duty cycle of both of the switches S, and $S_2$ so that the dead time is increased. In this example, the duty cycle is reduced to 80% to provide the desired current of 1 A.

FIGS. 11 and 12 show the battery current responses for 100% duty cycle ($T_{BC}$)—where the dead time is zero or negligible—and for a reduced (80%) value of duty cycle $T_{BCR}$. It can be observed that a reduction of duty cycle brings the battery current down and the 1 A nominal battery discharge current is reached at the $f_{ratio}$ optimized switching frequency, resulting in the most optimized power supply for lamp arc and cathodes.

Figure 13:
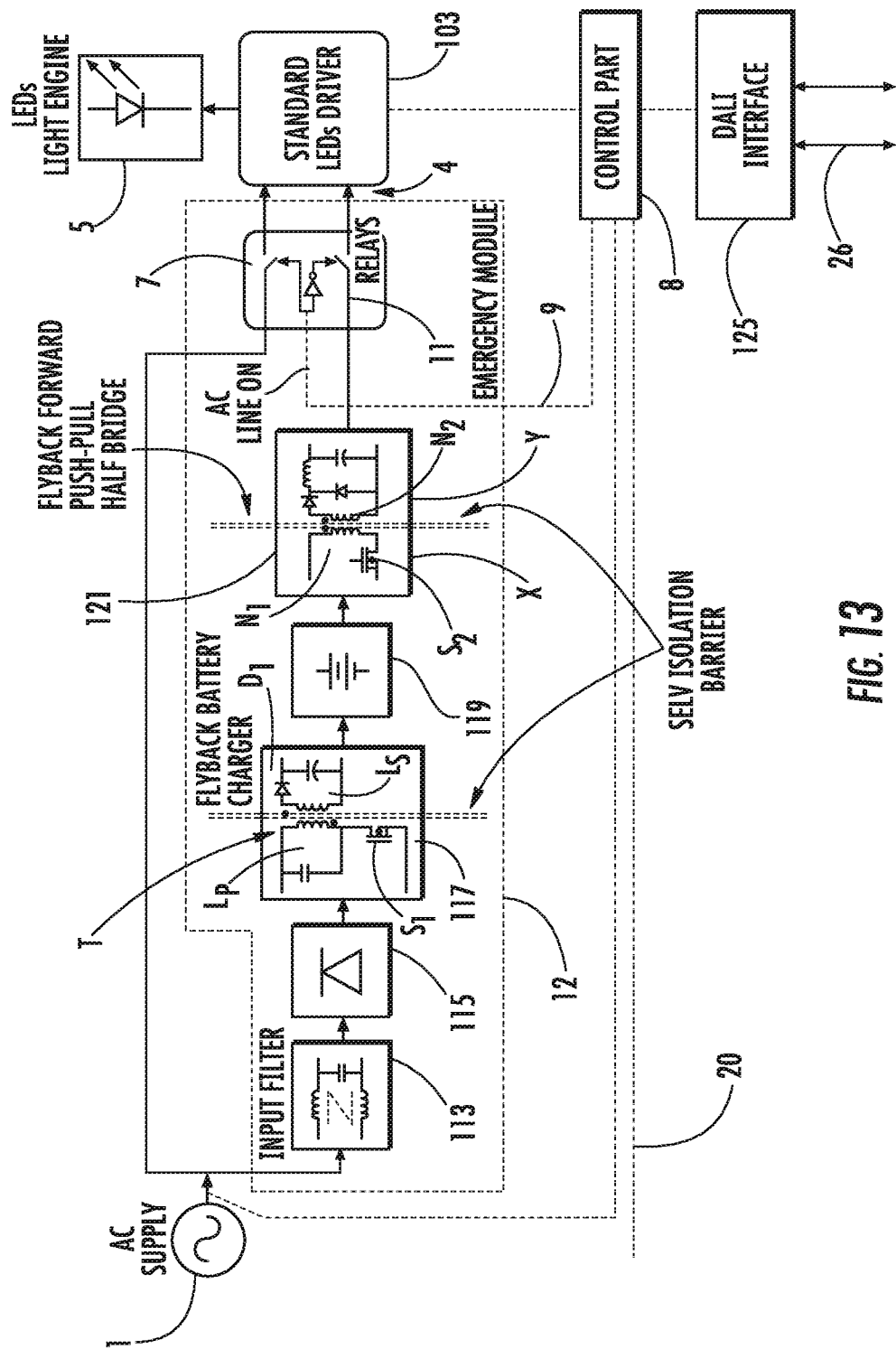
FIG. 13 shows schematically the elements of an additional embodiment of a lighting arrangement that provides both a normal mode and an emergency lighting mode.

FIG. 13 shows schematically the elements of a lighting arrangement, according to an alternate embodiment that provides both a normal mode and an emergency lighting mode. A direct mains AC supply 1 provides power in the normal mode to a driver 3 optimized for use with the mains supply 1 (e.g. 230 volts, 50 Hz in the EU).

The driver 103 is supplied with power at a mains input 4 when a mains relay 7 is closed. A control part 8 monitors the mains AC supply 1. If the control part 8 detects that the mains AC supply 1 is interrupted, or if it is determined to be malfunctioning (operating outside an acceptable range of values), the control part 8 may provide an appropriate signal to relay control line 9 to open the mains relay 7 and to close an emergency relay 11. The emergency relay 11 allows the lamp 5 to be driven in an emergency mode. The driver 103 is preferably an independent driver which is only connected to the mains AC supply through the mains relay 7 which is closed when mains AC supply is available. In a preferred embodiment there is no additional link between driver 103 and emergency lighting module 12.

To provide the emergency mode, an emergency lighting module 12 includes, in addition to the mains relay 7, relay control line 9 and emergency relay 11, a smoothing input filter 113, a rectifier 115 (typically a bridge rectifier), a battery charger 117 (a SELV, Separated Extra Low Voltage, isolated DC-DC converter, a flyback converter, for example), a battery 119 and a step-up converter 121. The battery charger 117 may provide galvanic isolation between the AC mains supply 1 and the battery 119 for safety reasons. The converter 121 may likewise provide galvanic isolation of the battery 119 from the lamp 5.

The battery 119 may comprise a plurality of cells. Another energy storage device may be used instead of the battery 119.

When the mains AC supply 1 is operating normally (and the lamp 5 is powered by the AC supply 1), the battery 119 may be charged (continuously or when required) by the battery charger 117. The mains relay 7 is closed when mains AC supply 1 is operating normally and the LED is fed by the Standard LED driver 3. When the control part 8 detects that the AC supply 1 is interrupted (or malfunctioning), the emergency relay 11 is closed (the mains relay 7 is opened), and the driver 3 illuminates the lamp 5 using power from the battery 119.

As discussed above, the lighting arrangement shown in FIG. 13 includes the control part 8 which detects when the AC mains supply 1 is present and operating correctly—such as when the AC mains supply 1 presents a voltage higher than a certain threshold (187 volts in a 230 volt nominal supply, for example). When the AC mains supply 1 is present and operating correctly, the AC supply 1 provides power to illuminate the lamp via closed relay 7. Power from the AC mains supply 1 is also provided to battery charger 117 to charge the battery 119 (or to keep the battery 119 fully charged). The control part 8 is preferably a part of the emergency lighting module 12.

The battery charger 117 is constituted, in this example, by a so-called flyback converter which exhibits, on the one hand, a transformer T with a primary winding $L_P$ and a secondary winding $L_S$ and also, on the other hand, a controllable switch $S_1$. In known manner, by an appropriate alternating opening and closing of the switch $S_1$ the energy made available by the AC mains supply 1 is transmitted to the secondary side of the flyback converter and utilized for the purpose of charging the battery 119. The transmission of energy takes place in the open state of the switch S1, wherein for this purpose a diode $D_1$ is furthermore provided on the output side of the flyback converter. The battery charger 117 is constituted by an isolated DC-DC converter. Instead of a flyback converter other isolated converter topologies like a forward converter or an isolated SEPIC converter may be used as well.

The control part 8 also controls various aspects of operation of the driver 3, including the power supplied to the LED lamp 5—so that the level of illumination (dimming) can be varied.

The control part 8 monitors switched mains input 20, and, in the normal mode of operation, illuminates the LED lamp 5 (using the driver 103) when the switched mains input 20 is on.

The control part 8 may determine the status of the switched mains input 20 in any suitable manner. For example, it is known to apply the switched mains input 20 to a potential divider, and then to a voltage threshold detector with an isolation circuit, such as an opto-coupler. Typically, the switched mains input 20 is rectified by a rectifier before being applied to the voltage threshold detector and the isolation circuit. When the switched mains input 20 is on, the output of the isolation circuit will be a pulsed signal, the presence of which can be detected by logic within the control part 8. When the switched mains input 20 is off, the output of the isolation circuit will be a constant value (zero volts) and this can also be detected by logic of the control part 8. The control part 8 then operates the driver 103 and lamp 5 in accordance with the state of the switched mains input 20.

The lighting system may optionally comprise an interface 125, e.g. a DALI (Digital Addressable Lighting Interface), that is connected to a bus 26 (e.g. DALI bus), for intensity control (dimming) and/or for maintenance and service control. DALI is a communication protocol widely used in lighting systems. A two wire serial communication arrangement establishes a master/slave communication between a central DALI controller (not shown) and the lighting system control part 8 by setting low and high levels of voltages. Data are transferred between the DALI controller and lighting system control part 8, by means of an asynchronous, half-duplex, serial protocol over a two-wire differential bus, with a fixed data transfer rate of 1200 bit/s. The DALI data are transmitted using Manchester encoding. The protocol standard sets high levels as voltage differences high at 9.5V (either positive or negative) between the two wires. Low levels are set as voltage differences of less than 6.5V.

The converter 121 may comprise a flyback or forward or push-pull or half-bridge or isolated boost converter with a step-up characteristic and a SELV isolation barrier, whose input is connected directly to the battery 119. The converter 121 may comprise as an alternative variant a non-isolated topology as for example a buck-boost converter.

The converter 121 comprises an input part X. The input part X comprises a switch $S_2$ and a primary winding section $N_1$ which is connected in parallel across the battery 119. By operation of the switch $S_2$, the input part produces a rectangular output voltage. The time for which each of the switch is closed and the frequency of operation (opening/closing) of the switch is controlled by a driver controller (not shown).

The input part X of the converter 121 supplies an output part Y. The output part Y includes a secondary winding $N_2$ with a rectifier unit and a smoothing filter, e.g. an L (inductor) series C (capacitor) parallel filter, connected to it. The rectifier unit may be formed by a single diode or by full wave rectifier. The converter 121 may provide a DC voltage or an AC voltage on its output. In case of an DC output the output part Y may comprise a rectifier and smoothing filter as shown in the example. When the control part 8 detects that the AC mains supply 1 is interrupted or malfunctioning—such as when the mains AC supply 1 presents a voltage lower than a certain threshold (145 volts in a 230 volt nominal supply, for example) the control part 8 opens the mains relay 7, closes the emergency relay 11, and activates the converter 121. The converter 121 provides power to illuminate the lamp 5 from only the battery 119 via the closed emergency relay 11.

In accordance with an important feature of the embodiment, the converter 121 may provide an output at normal mains level so that the output can be applied to the same mains input 4 of the driver 103 as the AC mains supply 1 in the emergency mode. It is also possible that the converter 21 provides an output at a level different from the normal mains level but which is nevertheless sufficient so that the output can be applied to the same mains input 4 of the driver 103 as the AC mains supply 1 in the emergency mode. The same components of the driver 103 may be used in both the normal and emergency modes. The converter 121 may provide a DC voltage or an AC voltage to the mains input 4 of the driver 103. Optionally, the AC mains supply 1 may be applied to a rectifier unit and a smoothing filter (not shown) so that a smoothed DC voltage is applied to the mains input 4 of the driver 103 in the normal mode.

This has the advantage that a separate driver for driving the LED light unit 5 is not required in the emergency mode. Because the output of the converter 121 is at (or near) the normal mains level, it can be applied to the driver 103 as if it was the AC mains supply 1. No modification to the driver 103 is required to allow an emergency mode to be possible. This is advantageous if it is desired to add emergency mode functionality to an existing light installation. The emergency module 12 can be added to the existing installation (comprising the driver 103, which is normally powered by the AC mains supply 1, and the LED light unit 5)—and the existing driver 103 can be used in the emergency mode without modification.

The converter 121 may be controlled in a way that a fixed discharge current of the charge storage device 119 can be achieved. The discharge current of the charge storage device 119 can be controlled by the converter 121. Preferably the converter 121 is operated in a way where the discharge current of the charge storage device 119 is fixed or is depending on a given curve depending on the voltage or status of the charge storage device 119. Such control of the converter 121 of the discharge current of the charge storage device 119 can offer an optimized utilization of the charge storage device 119 according to the given capacity of this charge storage device 119 and/or depending on the expected or intended duration of the emergency mode.

Depending on the type of mains voltage detected on the direct mains input 1, the control part 8 may put the driver 103 into different operation modes, e.g. to illuminate the lamp 5 at a given intensity level. For example, if it is detected that the direct mains input 1 is absent or malfunctioning (emergency mode), the control unit may cause the driver 103 to lower the light intensity level of the lamp unit 5 (dimming) in order to reduce power consumption.

It is also possible the there is no DALI bus 26 and no control part 8. In such case the driver 103 can be formed to be able to monitor the voltage on the mains input 4 of the driver 103 and to detect a change of the mains input 4 by a detection of the type of voltage or amplitude of the voltage detected on the mains input 4 of the driver 3. For example the operation mode of the driver 103 can be changed to emergency mode in case where a DC voltage is detected on the mains input 4 of the driver 103. The driver 103 may be able to detect that it is supplied with a voltage at a level different from the normal mains level and may be able to automatically reduce the current or power supplied to the LED 5 in such case as can be detected as operation in emergency mode.

The dimming level may also be varied by signaling via the DALI interface 125 and DALI bus 26.

Although the embodiment uses a forward converter as emergency mode converter means 121, several other converter arrangements, e.g. a push-pull converter, are able to provide a suitable voltage output, and may be used in accordance with the invention.

If the battery is changed, for example by adding additional cells (or replacing the battery with a different battery), or in any other way, this may alter the nominal current. In response to this, the switch duty cycle may be adjusted so that the current drawn from the battery is at the optimum level despite the changes to the characteristics of the battery. Further, if the characteristics of the battery are changed, this may alter the optimum proportion of power that is provided to the lamp (e.g. to the lamp arc and the lamp cathodes). If a cell is added, typically, the power applied to the lamp (e.g. arc and cathodes) should remain the same (increasing the power applied to the cathodes would just generate heat and increasing the power used for light would just lead to increased light output). The embodiment allows the proportion of power provided to the lamp cathodes and the lamp arc to be adjusted by selecting an appropriate frequency of the operation of the switches of the emergency converter. This allows to extend the time where power can provided by the additional cell to be applied to the lamp, and thereby resulting in increased time of illumination in emergency mode, rather than being used for higher light output. This could also allow additional power provided by the additional cell to be applied to the lamp arc, and thereby resulting in increased illumination, rather than being wasted by producing heat. It also allows to keep the current or power drawn from the battery constant independent of the number or type of battery and also independent of the type of lamp connected. In case of a light emitting diode as a lamp it is sufficient to control the power provided to the lamp as no cathode heating is necessary. In case of such LED lamp the current or power drawn from the battery can be adjusted to a fixed value irrespective of the lamp load or battery load.

If the nature of the lamp unit is changed, the embodiment allows the altered lamp unit to be driven in an optimal way. For example, if an additional fluorescent bulb or light emitting diode is added to the lamp unit, this could increase the total current drawn from the battery. Adjusting the duty cycle of the switches S1 and S2 allows the optimal nominal current drawn from the battery to be maintained despite the alternation of the lamp unit characteristics.

The system may control the current or power drawn from the battery set. It may be important that the current drawn from the battery (which is the battery discharge current) remains constant in order to extend the overall battery life time and to extend the time where the battery can supply the lamp in an emergency mode. As the battery voltage is almost constant for most of the discharge period it may be also possible to control the power drawn from the battery as this power control will lead to an almost constant current for most of the discharge period.

For simplifying the explanation, harmonics changes with duty cycle are not included in this example, although they may become significant in the design.

Although the embodiment uses a push-pull converter, several converter arrangements are able to provide a suitable higher rectangular voltage output, such as a simple cascade of a boost converter and an inverter. All drivers where pulse modulation, e.g. pulse width modulation, and frequency modulation can be applied may be used in accordance with the invention.

What is claimed is:

1. A power supply system, for illuminating an LED lamp unit (5), having an emergency mode of operation, in which the LED lamp unit (5) is supplied by a charge storage device (119), the system comprising:
    an emergency mode converter (121) configured to step-up a voltage from the charge storage device (119) and to supply an input (4) for illuminating the LED lamp unit (5), wherein the emergency mode converter (21) comprises a flyback or a forward converter and provides galvanic isolation of the charge storage device (19) from the LED lamp unit (5);
    a battery charger (117) comprising a flyback converter, which charges the charge storage device (119) and provides galvanic isolation between an AC mains supply (1) and the charge storage device (119); and
    a driver (103) configured to receive power from a power supply and operable to provide the lamp power from the power supply, wherein the driver is operable to adjust the total power provided to the lamp unit from the power supply and to adjust current drawn from the charge storage device (119) at an optimum level despite changes to the characteristics of the charge storage device or alternation of the lamp unit characteristics.

2. The system of claim 1, wherein the emergency mode converter (121) is configured to step-up the voltage from the charge storage device (119) to a similar voltage to that of the mains power in the normal mode or operation.

3. The system of claim 1, further comprising a controllable switch (7, 9, 11) configured to selectively provide mains power (1) to the mains input (4) of the driver (103) in a normal mode, and power from the charge storage device (119) to the mains input (4) of the driver (103) in the emergency mode.

4. The system of claim 1, wherein the driver (103) is configured to monitor the voltage on the mains input (4) of the driver (103) and to detect a change of the mains input (4) by a detection of the type of voltage or amplitude of the voltage detected on the mains input (4) of the driver (103).

5. The system of claim 1, wherein the system comprises an interface (125), which is connected to a bus (26) for at least one of intensity control or maintenance and service control.

6. The system of claim 1, wherein the flyback converter of battery charger (117) comprises by a transformer (T) with a primary winding ($L_P$) and a secondary winding ($L_S$) and a controllable switch (S1).

7. The system of claim 6, wherein the by an appropriate alternating opening and closing of the switch (S1) the energy made available by the mains supply (1) is transmitted to the secondary side of the flyback converter and utilized for the purpose of charging the charge storage device (119), whereby the transmission of energy takes place in the open state of the switch (S1), wherein for this purpose a diode (D1) is furthermore provided on the output side of the flyback converter.

8. The system of claim 1, wherein pulse width modulation (PWM) is used in the form of dead time or duty cycle control in order to obtain the correct current or power levels drawn from the charge storage device (119).

9. The system of claim 1, wherein the frequency of operation of at least one switch (S1) of emergency mode converter (121) is controlled to set the total power provided to the lamp unit.

10. A power supply system, for illuminating an LED lamp unit (5), having an emergency mode of operation, in which the LED lamp unit (5) is supplied by a charge storage device (119), the system comprising:
    an emergency mode converter (121) configured to step-up a voltage from the charge storage device (119) and to supply an input (4) for illuminating the LED lamp unit (5), wherein the emergency mode converter (121) comprises a flyback or a forward converter and provides galvanic isolation of the charge storage device (119) from the LED lamp unit (5);
    a battery charger (117) comprising a flyback converter, which charges the charge storage device (119) and provides galvanic isolation between an AC mains supply (1) and the charge storage device (119), wherein a discharge current of the charge storage device (119) is fixed or is dependent on a given curve depending on a voltage or status of the charge storage device (119); and
    a driver (103) configured to receive power from a power supply and operable to provide the lamp power from the power supply, wherein the driver is operable to adjust the total power provided to the lamp unit from the power supply and to adjust current drawn from the charge storage device (119) at an optimum level despite changes to the characteristics of the charge storage device (119) or alternation of the lamp unit characteristics.

11. The system of claim 10, wherein the emergency mode converter (121) is configured to step-up the voltage from the charge storage device (119) to a similar voltage to that of the mains power in the normal mode or operation.

12. The system of claim 10, further comprising a controllable switch (7, 9, 11) configured to selectively provide mains power (1) to the mains input (4) of the driver (103) in a normal mode, and power from the charge storage device (119) to the mains input (4) of the driver (103) in the emergency mode.

13. The system of claim 10, wherein the driver (103) is configured to monitor the voltage on the mains input (4) of the driver (103) and to detect a change of the mains input (4)

by a detection of the type of voltage or amplitude of the voltage detected on the mains input (4) of the driver (103).

14. The system of claim 10, wherein the system comprises an interface (125), which is connected to a bus (26) for at least one of intensity control or maintenance and service control.

15. The system of claim 10, wherein the flyback converter of battery charger (117) comprises by a transformer (T) with a primary winding ($L_P$) and a secondary winding ($L_S$) and a controllable switch (S1).

16. The system of claim 15, wherein the by an appropriate alternating opening and closing of the switch (S1) the energy made available by the mains supply (1) is transmitted to the secondary side of the flyback converter and utilized for the purpose of charging the charge storage device (119), whereby the transmission of energy takes place in the open state of the switch (S1), wherein for this purpose a diode (D1) is furthermore provided on the output side of the flyback converter.

17. The system of claim 10, wherein pulse width modulation (PWM) is used in the form of dead time or duty cycle control in order to obtain the correct current or power levels drawn from the charge storage device (119).

18. The system of claim 10, wherein the frequency of operation of at least one switch (S1) of emergency mode converter (121) is controlled to set the total power provided to the lamp unit.

19. A power supply system, for illuminating an LED lamp unit (5), having an emergency mode of operation, in which the LED lamp unit (5) is supplied by a charge storage device (119), the system comprising:
   an emergency mode converter (121) configured to step-up a voltage from the charge storage device (119) and to supply an input (4) for illuminating the LED lamp unit (5), wherein the emergency mode converter (121) comprises a flyback or a forward converter and provides galvanic isolation of the charge storage device (119) from the LED lamp unit (5);
   a battery charger (117) comprising a flyback converter, which charges the charge storage device (119) and provides galvanic isolation between an AC mains supply (1) and the charge storage device (119), wherein a current or power drawn from the charge storage device (119) is adjustable to a fixed value; and
   a driver (103) configured to receive power from a power supply and operable to provide the lamp power from the power supply, wherein the driver is operable to adjust the total power provided to the lamp unit from the power supply and to adjust current drawn from the charge storage device (119) at an optimum level despite changes to the characteristics of the charge storage device (119) or alternation of the lamp unit characteristics.

* * * * *